(12) United States Patent
Yang (10) Patent No.: US 6,297,858 B1
(45) Date of Patent: Oct. 2, 2001

(54) METHOD AND APPARATUS FOR DETECTING VIDEO TRANSMISSIONS

(75) Inventor: Ivan W Y Yang, Markham (CA)

(73) Assignee: ATI Technologies, Inc., Thornhill (CA)

( * ) Notice: Subject to any disclaimer, the term of this patent is extended or adjusted under 35 U.S.C. 154(b) by 0 days.

(21) Appl. No.: 08/933,761

(22) Filed: Sep. 23, 1997

(51) Int. Cl.[7] .................................................. H04N 5/50

(52) U.S. Cl. ...................... 348/731; 348/732; 348/192; 348/558

(58) Field of Search ........................... 348/725, 726, 348/727, 728, 731, 732, 733, 735, 180, 192, 558, 6, 460, 729, 552, 555, 554, 487

(56) References Cited

U.S. PATENT DOCUMENTS

| | | | |
|---|---|---|---|
| 4,451,850 | * 5/1984 | Kamemoto | 348/731 |
| 4,868,892 | * 9/1989 | Tults et al. | 348/732 |
| 5,087,977 | * 2/1992 | Suizu | 348/735 |
| 5,428,405 | * 6/1995 | Lee | 348/731 |
| 5,479,214 | * 12/1995 | Sakakibara et al. | 348/731 |
| 5,621,767 | * 4/1997 | Brandt et al. | 348/735 |
| 5,625,422 | * 4/1997 | Kim | 348/731 |
| 5,659,352 | * 8/1997 | Lee | 348/731 |
| 5,886,746 | * 3/1999 | Yuen et al. | 348/731 |

OTHER PUBLICATIONS

Standards Proposal No. 2045–B, Proposed Upgrade of EIA/IS–6 to an ANSI/EIA Standard "Cable Television Channel Identification Plan", Jan. 2000.*

* cited by examiner

*Primary Examiner*—Michael Lee
*Assistant Examiner*—Trang U. Tran
(74) *Attorney, Agent, or Firm*—Vedder, Price, Kaufman & Kammholz (57) ABSTRACT

A method and apparatus for detecting validity of video transmissions in accordance with one of a plurality of channel identification plans is be accomplished by first detecting selection of a channel, wherein the channel corresponds to a particular video transmission. The signal strength of the video transmission is then tested over a frequency range relating to the channel. When the signal strength of the video transmission at a particular frequency exceeds a threshold, a video tuner utilizes the frequency to detect the video transmission. Upon detecting the video transmission, the video tuner outputs a base band signal of the video transmission to a video decoder. The video decoder converts the base band signal into a digitized video, which is checked to determine whether it includes a synchronization signal. If the digitized video includes a synchronization signal, the video transmission is deemed to be valid, i.e., it is in accordance with one of the plurality of channel identification plans. If, however, the digitized video does not include the synchronization signal or the signal strength at each of the frequencies of the frequency range did not exceed the threshold, the video transmission is deemed to be invalid, i.e., it is not in accordance with any of the channel identification plans.

11 Claims, 6 Drawing Sheets

METHOD AND APPARATUS FOR DETECTING VIDEO TRANSMISSIONS

TECHNICAL FIELD OF THE INVENTION

This invention relates generally to video transmissions and more particularly to a method and apparatus for identifying one of a plurality of carrier frequencies that supports a video transmission channel.

BACKGROUND OF THE INVENTION

As is generally known, video transmissions, i.e., the transmission of video data, may occur over the air (E.g., broadcast television), over cable transmission links, or over satellite transmission links. Regardless of the type of video transmissions, each video transmission includes a carrier frequency on which video data and audio data are carried. A receiving television unit, or computer equipped with a television tuner, receives the video transmissions via an antenna (for over the air transmissions), a set top box (for cable transmissions), or a satellite dish and set top box (for satellite transmissions). The television unit demodulates the carrier frequency of a selected video transmission (i.e., the channel selected by the viewer) to recapture video data and audio data. The video and audio data are processed and subsequently rendered visible and audible for the viewer.

The television unit, or television tuner, includes a decoder that has an adjustable narrow band pass filter. The narrow band pass filter attenuates the signals of non-selected channels (i.e., other video transmissions) and passes the signals of the selected channel to a video decoder. For cable television, channels are spaced at approximately six MHz (6 MHz), such that the band pass filter of the tuner needs to be much less than 6 MHz (E.g., in the range of a few hundred KHz). While the channels are spaced at approximately 6 MHz, there are currently three different standards for channel identification. The first standard is the standard frequencies (STD), which transmits on the standard off-air frequencies for channels 2 through 6 and 7 through 13. For other channels, the STD standard uses supplemental channels that are 6 MHz increments down from channel 7 (175.25 MHz) to 91.25 MHz (channels 14–22 and 95–99) and upwards from channel 13 (211.25 MHz).

The second cable television channel identification standard is the harmonic related carriers (HRC). The HRC standard transmits on picture carrier frequencies that are multiples of 6.0003 MHz and starts at 54 MHz. It involves frequency displacement of 1.25 MHz on all standard and supplementary channels except channels 5 and 6, where the displacement is 0.75 MHz. The third cable channel identification standard is the incremental related carriers (IRC). The IRC standard transmits on picture carrier frequencies starting at 55.25 MHz and increments each channel by 6 MHz.

Cable companies utilize one of the three standards. The set top boxes provided to customers by the cable companies include the tuner that has been hard coded to center the band pass filter based on the particular standard. When configured in this manner, if a tuner receives a signal that was transmitted under a different standard, the tuner would attenuate the signal such that the video quality would be poor at best.

With the current deregulation of communications, it is conceivable for a consumer to receive cable broadcasts from cable carriers that use different channel identification plans. For a consumer to receive a high quality video picture from cable companies using different channel identification plans, the consumer would need to adjust its television tuner, or cable set top box, to identify which channel identification plan is being used. While many television tuners are equipped with auto fine tuning (AFT) their range is limited to 100 to 200 kilohertz. Because the frequency difference between the channel identification plans is in the range of one to two MHz, the auto fine tuning is inadequate to automatically adjust the tuner to receive various formatted video transmissions Therefore, a need exists for a method and apparatus for detecting video transmissions that have been formatted based on any one of a plurality of channel identification plans.

DETAILED DESCRIPTION OF A PREFERRED EMBODIMENTS

Generally, the present invention provides a method and apparatus for detecting validity of video transmissions in accordance with one of a plurality of channel identification plans. This may be accomplished by first detecting selection of a channel, wherein the channel corresponds to a particular video transmission. The signal strength of the video transmission is then tested over a frequency range relating to the channel. When the signal strength of the video transmission at a particular frequency exceeds a threshold, a video tuner utilizes the frequency to detect the video transmission. Upon detecting the video transmission, the video tuner outputs a base band signal of the video transmission to a video decoder. The video decoder converts the base band signal into a digitized video, which is checked to determine whether it includes a synchronization signal. If the digitized video includes a synchronization signal, the video transmission is deemed to be valid, i.e., it is in accordance with one of the plurality of channel identification plans. If, however, the digitized video does not include the synchronization signal or the signal strength at each of the frequencies of the frequency range did not exceed the threshold, the video transmission is deemed to be invalid, i.e., it is not in accordance with any of the channel identification plans. With such a method and apparatus, automatic tuning of a video system is obtained regardless of which type of channel identification plan is being used. As such, consumers need not burden themselves with manual selection of the particular channel identification plan being utilized by their service provider or providers.

Figure 1:
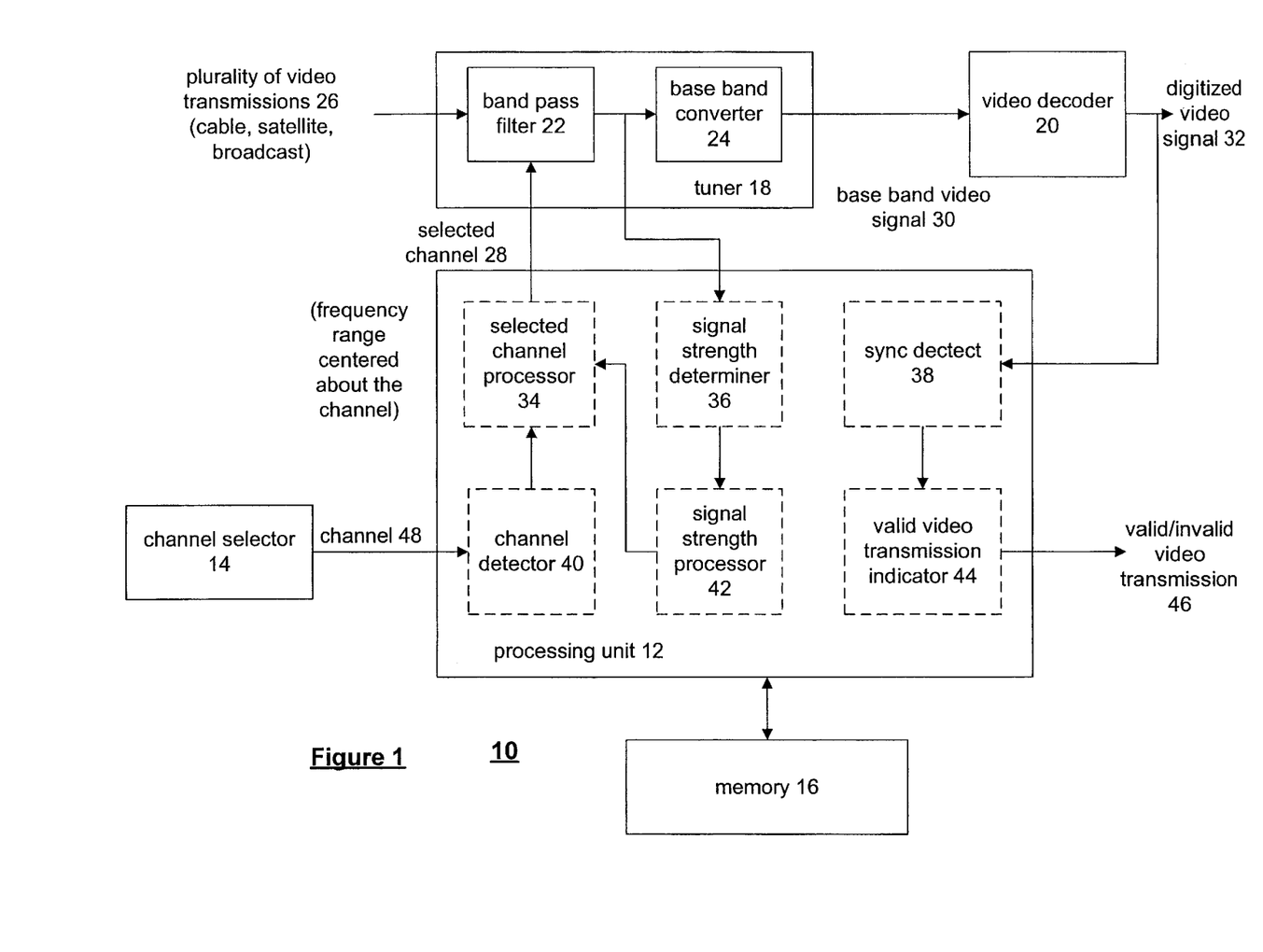
FIG. 1 illustrates a schematic block diagram of a video processing circuit in accordance with the present invention.

The present invention can be more fully described with reference to FIGS. 1 through 6. FIG. 1 illustrates a schematic block diagram of a video system 10 that includes a processing unit 12, channel selector 14, memory 16, a tuner 18, and a video decoder 20. The video system 10 may be a television set or a television tuner circuit, such as the All-In-Wonder produced by ATI Technologies, which is incorporated into a computer. The processing unit 12 may be a microprocessor, a microcontroller, a microcomputer, a digital signal processor, a central processing unit of a computer system, or any other device that manipulates digital information based on programming instructions. The memory 16 may be a read-only memory, random access memory, DVD ROM, CD-ROM, floppy disk memory, hard disk memory, or any other means for storing digital information.

The tuner 18 includes a band pass filter 22 and a base band converter 24. The band pass filter 22, based on a selected channel 28, filters all but one of a plurality of video transmissions 26 to produce a filtered video transmission. Note that the plurality of video transmissions may be received via a cable transmission medium, a satellite transmission medium, or broadcast television. The filtered video transmission is provided to the base band converter 24, which converts the filtered video transmission into a base band video signal 30. Upon receiving the base band video signal 30, the video decoder 20 digitizes it to produce a digitized video signal 32, which is subsequently rendered visible. The tuner 18 and the video decoder 20 function in a similar manner as to the tuner and video decoder of the All-in-Wonder, which is manufactured by ATI Technologies.

The processing unit 12 produces the selected channel 28 based on channel input 48 from the channel selector 14 and programming instructions stored in memory 16. When executing the programming instructions, the processing unit 12 functions as a selected channel processor 34, a signal strength determiner 36, a sync detect circuit 38, a channel detector 40, a signal strength processor 42, and a valid video transmission indicator 44. The channel detector 40 receives the channel input 48 from the channel selector 14. Note that the channel selector 14 functions in a similar manner as a channel selector for a television set or as the channel selector of the All-In-Wonder manufactured by ATI. The channel detector 40 detects the channel 48, regardless of the channel identification plan, and provides an indication of the channel 48 to the selected channel processor 34. For example, if channel 2 has been selected, which has a picture carrier frequency of 55.2500 MHz (STD), 54.027 MHz (HRC), and 55.265 MHz (IRC), the channel detector 40 would assume, regardless of which channel identification plan is used, that the channel selector 14 has selected channel 2. This assumption is valid because the channels are separated by approximately 6 MHz, thus a channel having a carrier frequency in the range of 54 to 56 MHz would most likely be channel 2.

The selected channel processor 34, based on the channel information received from the channel detector 40, generates a plurality of frequencies approximately centered about the particular channel. The selected channel processor 34 outputs the plurality of frequencies to the band pass filter 22 one frequency at a time. The band pass filter 22 uses the frequency to center its band pass region and provides a filter video signal based on the band pass region. The signal strength determiner circuit 36 receives the filtered video signal and determines its signal strength. The signal strength determination may be done using an received signal strength indication (RSSI) technique, a carrier-to-interference (C/I) technique, or an equivalent.

Once the signal strength is determined, the signal strength processor 42 compares the signal strength of the video transmission at the frequency to a threshold. The threshold is a normalized value of the video system 10 and is generally in the range of a value that is just above the noise floor to a value just under the peak signal. If the signal strength compared favorably with the threshold (i.e., is greater than for a non-inverted comparison), the filtered signal is provided to the base band converter 24 and the select channel processor 34 ceases its providing of the frequencies to the band pass filter 22. If the comparison was unfavorable (i.e., the signal strength was less than the threshold), the filtered signal is not passed to the base band converter 24 and the select channel processor provides another frequency to the band pass filter 22. The selected channel processor 34 will continue to provide, one at a time, frequencies to the band pass filter 22 until the signal strength exceeds the threshold or it has exhausted its frequency range.

When the signal strength exceeds the threshold, the video decoder 20 processes the base band signal 30 to produce the digitized video signal 32. The sync detect circuit 38 monitors the digitized video signal 32 to determine whether it contains a synchronization signal and provides a corresponding indication to the valid video transmission indicator 44. The valid video transmission indicator 44 outputs a valid or invalid video transmission signal 46. The valid video transmission signal is interpreted by the video system 10 to determine whether the video transmission should be displayed. An invalid video transmission signal would cause the video system to provide a blue screen, or some other means of identifying that the current channel selection does not have a corresponding valid video transmission. Note that the synchronization signal of the digitized video signal 32 is included in any one of the plurality of video transmissions 26 regardless of whether it was transmitted by cable, satellite, or broadcast television, or the channel identification plan. Further note that the functionality of the circuits of the processing unit 12 will be described in greater detail with reference to FIGS. 3 through 6.

Figure 2:
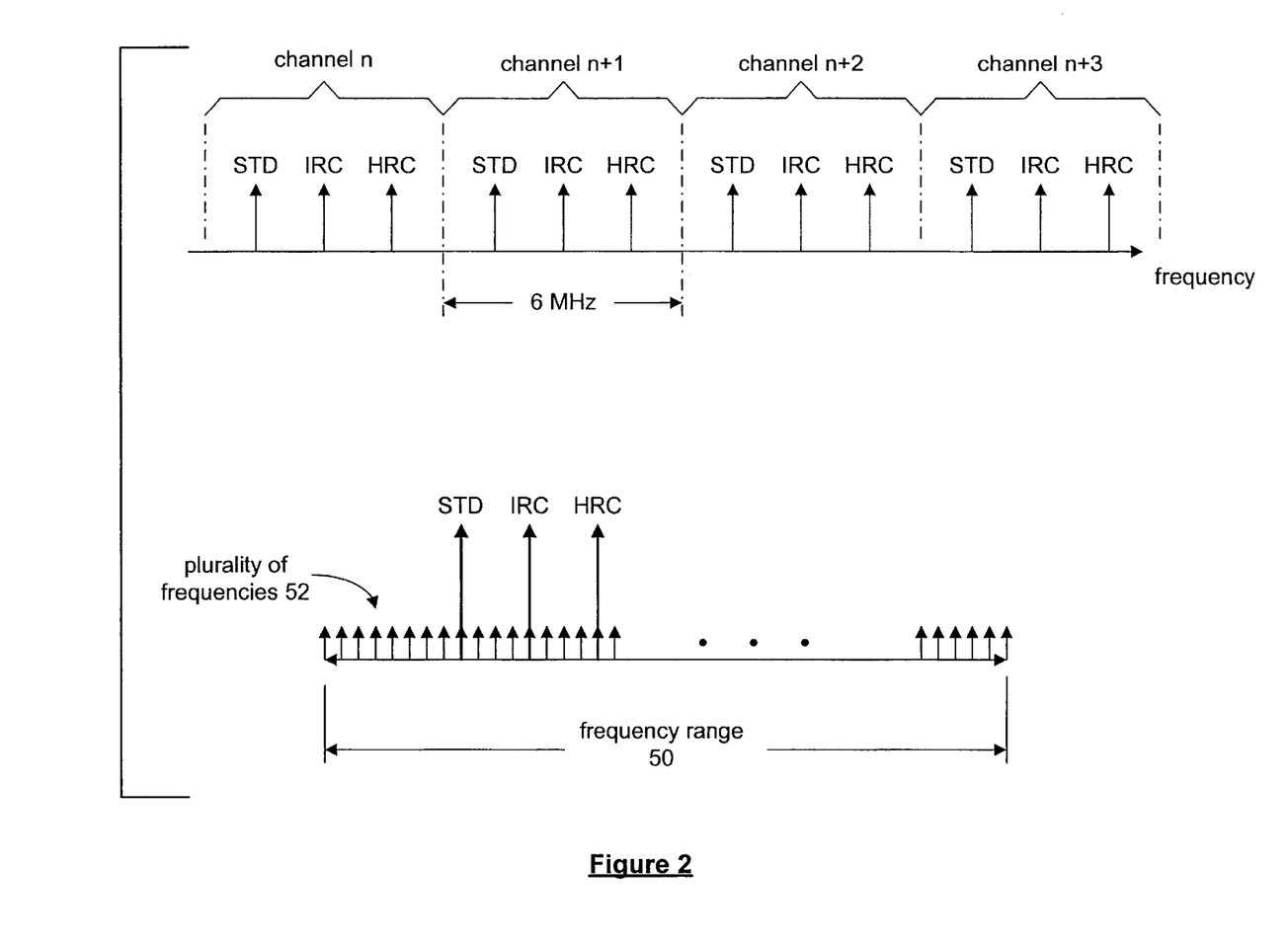
FIG. 2 illustrates a frequency spectrum of channels in accordance with the present invention.

FIG. 2 illustrates a frequency spectrum of a few channels (channel N, N+1, channel N+2, and channel N+3) of the plurality of channels that are currently available. Approximately 6 MHz separates each of the channels, where a channel may be represented by any one of the channel identification plan standards (STD, IRC, HRC). The channel identification plan standards further indicates that each channel has a lower channel edge at 1.25 MHz below the reference picture carrier frequency and an upper channel edge at 4.75 MHz above the referenced picture carrier frequency. Thus, a picture carrier frequency may be anywhere within the 6 MHz range.

The lower portion of FIG. 2 illustrates a frequency range 50 and a plurality of sample frequencies 52 for a given channel. By providing a plurality of frequencies 52 spaced 125 kilohertz apart, the video system 10 can detect whether the channel identification plan of the selected channel is the standard frequencies plan, harmonic related carriers plan, or incremental related carriers plan. Note that because the particular carrier frequency may be anywhere within the channel edge definition, a positive indication of a video transmission in the first few frequencies of the pluralities of frequencies may indicate that the video transmission is the preceding channel or is the current channel. For example, assume that channel 3 has been selected, where the upper-range of channel 2 is approximately 60.0125 MHz for the IRC plan, and the lower limit for channel 3 is 59.5125 MHz. When a positive indication of a video transmission occurs at approximately 60 MHz, one cannot tell whether channel 2 or channel 3 has been selected.

When a favorable comparison occurs in the first set of frequencies, the remainder of the plurality of frequencies are provided to the tuner to determine whether another one of the frequencies will produce a signal strength that is greater than the threshold. When another frequency causes the video transmission to have a signal strength greater than the threshold, one can be assured that the second frequency is the actual frequency. Thus for this example, the second frequency would be for channel 3 and the first frequency would be for channel 2. If another frequency did not produce a signal strength that exceeded the threshold, the first frequency would be used.

Figure 3:
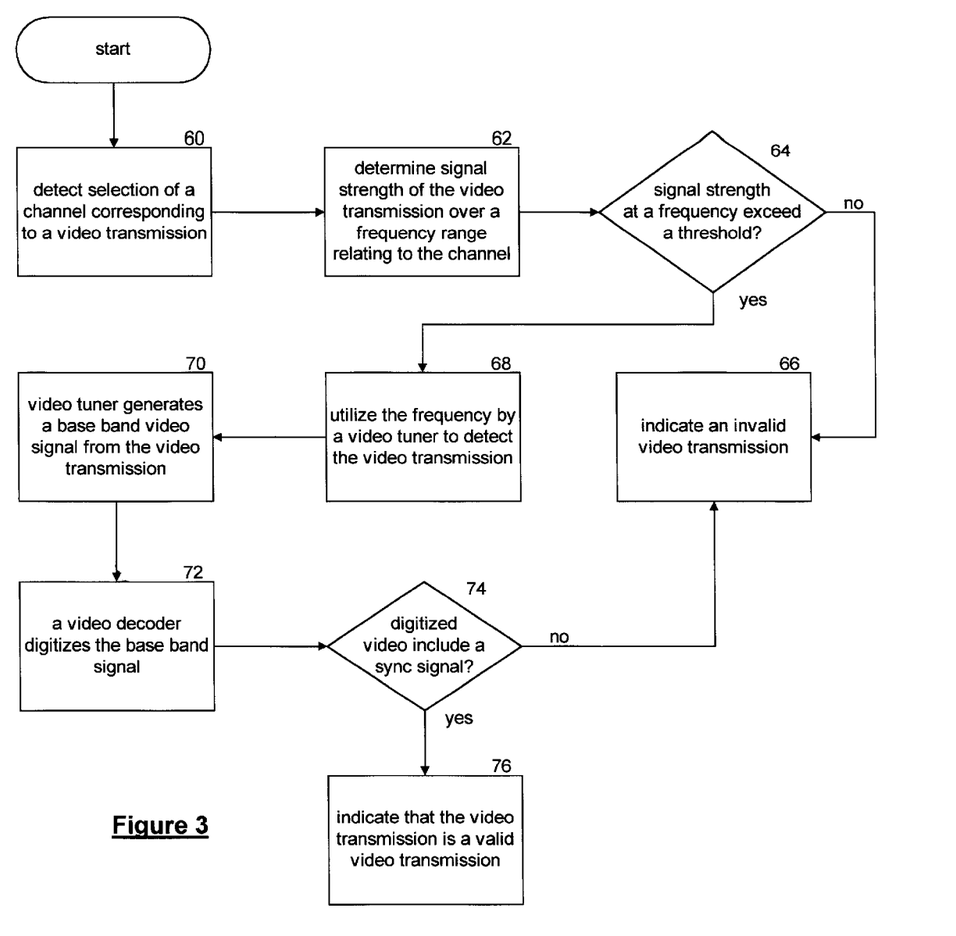
FIG. 3 illustrates a logic diagram for a method of indicating valid/invalid video transmissions in accordance with the present invention.

FIG. 3 ilustrates a logic diagram of a method for detecting a validity of a video transmission. A valid video transmission is one that corresponds to a channel of one of the channel identification plans and an invalid video transmission is one that does not correspond to a channel of one of the channel identification plans. The process begins at step 60 where selection of a channel corresponding to a video transmission is detected. Detection of channel selection occurs when the channel selector determines that a channel has been selected. The process then proceeds to step 62 where signal strength of the video transmission over a frequency range, on a frequency by frequency basis, is determined. Note that the frequency range relates to the particular channel selected. For example, if channel 3 were selected, the frequency range would center about the frequencies of channel 3, being in the range of 58.25 MHz to 66 MHz, effecting sweeping the entire channel edge range. Further note that a different frequency ranges may be used (E.g., one that does not sweep the entire channel edge range).

The process then proceeds to step 64 where a determination is made as to whether the signal strength at a particular frequency exceeds the threshold. If, the entire frequency range has been swept and the signal strength of the video transmission at each of the frequencies did not exceed the threshold, the process proceeds to step 66 where an indication of an invalid video transmission is provided. Such an indication may be used by the video system to provide a blue screen, or some other default screen indicating that the particular channel selected has no corresponding video transmission. In other words, the service providers are not using the particular channel selected by the consumer.

If, however, the signal strength of the video transmission exceeds a threshold at one of the thresholds, the process proceeds to step 68. At step 68, the tuner utilizes the frequency to detect the video transmission. The process then proceeds to step 70 where the video tuner generates a base band signal from the video transmission. The process then proceeds to step 72 where a video decoder digitizes the base band signal. At step 74, a determination is made as to whether the digitized video includes a sync signal. If not, the process reverts to step 66 where an indication of an invalid video transmission is provided. If, however, the digitized video includes a sync signal, the process proceeds to step 76. At step 76, an indication that the video transmission is valid is provided. Such an indication may be presenting the video data of the video transmission on an a ppropriate display or some other means for identifying that the transmission is valid.

Figure 4:
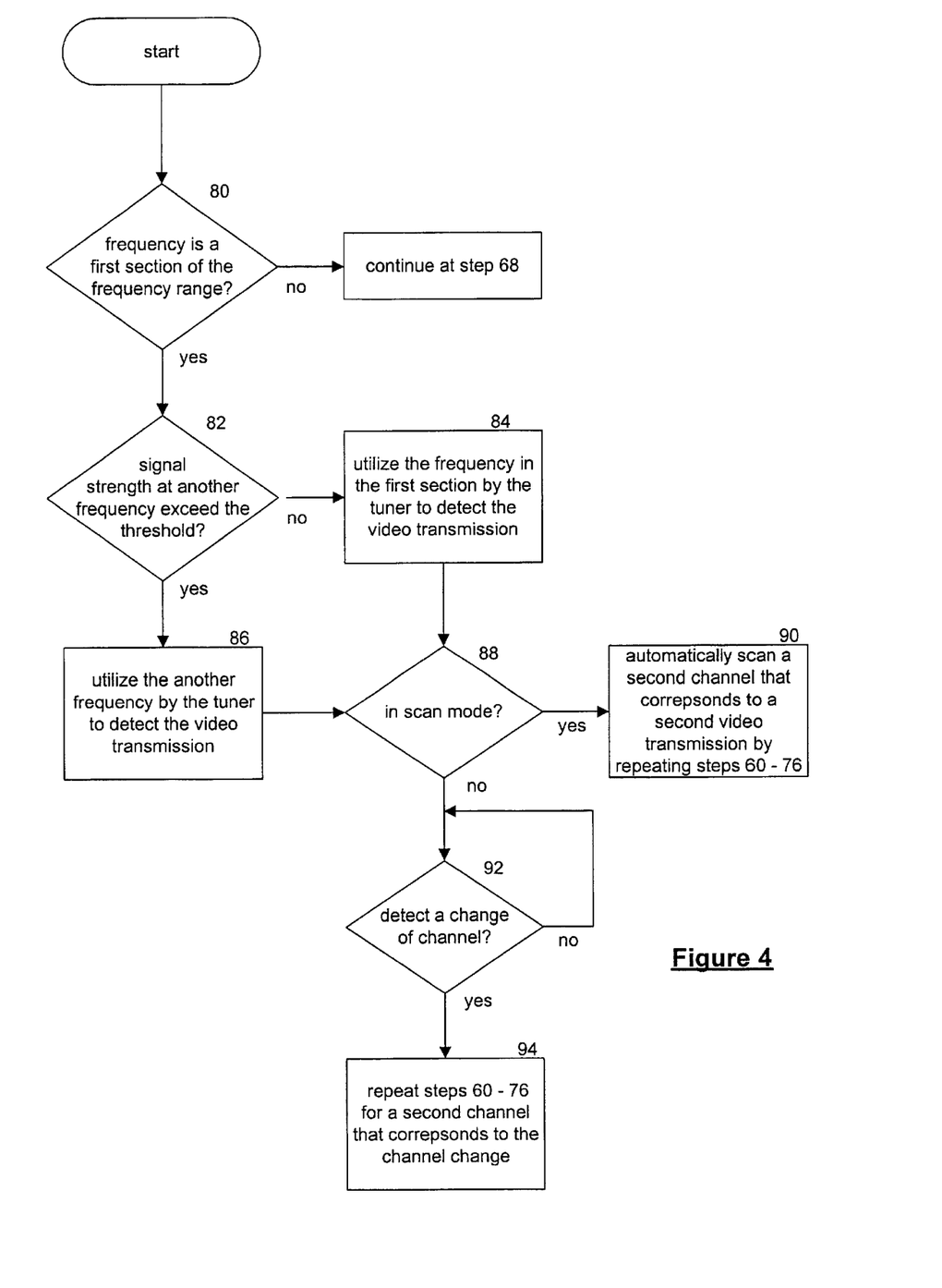
FIG. 4 illustrates a logic diagram for a method of detecting a video channel in accordance with the present invention.

FIG. 4 illustrates a logic diagram for a method of detecting whether the frequency identified is for the current channel selected or the preceding channel. The method of FIG. 4 would be in cluded between steps 64 and 68 of FIG. 3. The process of FIG. 4 begins at step 80 where a determination is made as to whether the frequency at which the video transmission has a signal strength that exceeds the threshold is in a first section of the frequency range. As previously mentioned, the channel edge definition allows a channel to be anywhere within the 6 MHz range of the channel space allocated. Thus, when a video transmission is identified at one of the channel edges, one cannot be certain as to whether the frequency corresponds to the currently selected channel or the preceding channel. So, for step 80, if the frequency occurs within the first one MHz of frequency samples, the answer is yes. If, however, the frequency did not occur in the first section of the frequency range, the process continues at step 68 of FIG. 3.

With the frequency occurring in the first section of the frequency range, the process proceeds to step 82 where a determination is made as to whether the signal strength at another frequency exceeds the threshold. If not, the process proceeds to step 84 where the frequency in the first section is used by the tuner to detect the video transmission. If, however, the signal strength at another frequency does exceed the threshold, the process proceeds to step 86 where the tuner utilizes another frequency to detect the video transmission.

Regardless of which frequency is used, the process proceeds to step 88 where a determination is made as to whether the video system is in a scan mode. If yes, the process proceeds to step 90 where the channels arc automatically scanned to identify a second channel which corresponds to a second video transmission. Having done this, the process at step 60 and is repeated through step 76 for the second channel and all other channels in the channel spectrum. If, however, the video system is not in the scan mode, the process proceeds to step 92. At step 92 a determination is made as to whether a channel change has been detected. Once a channel change has been detected, the process proceeds to step 94 where steps 60 through 76 of FIG. 3 are repeated for the second channel, which corresponds to the channel change.

Figure 5:
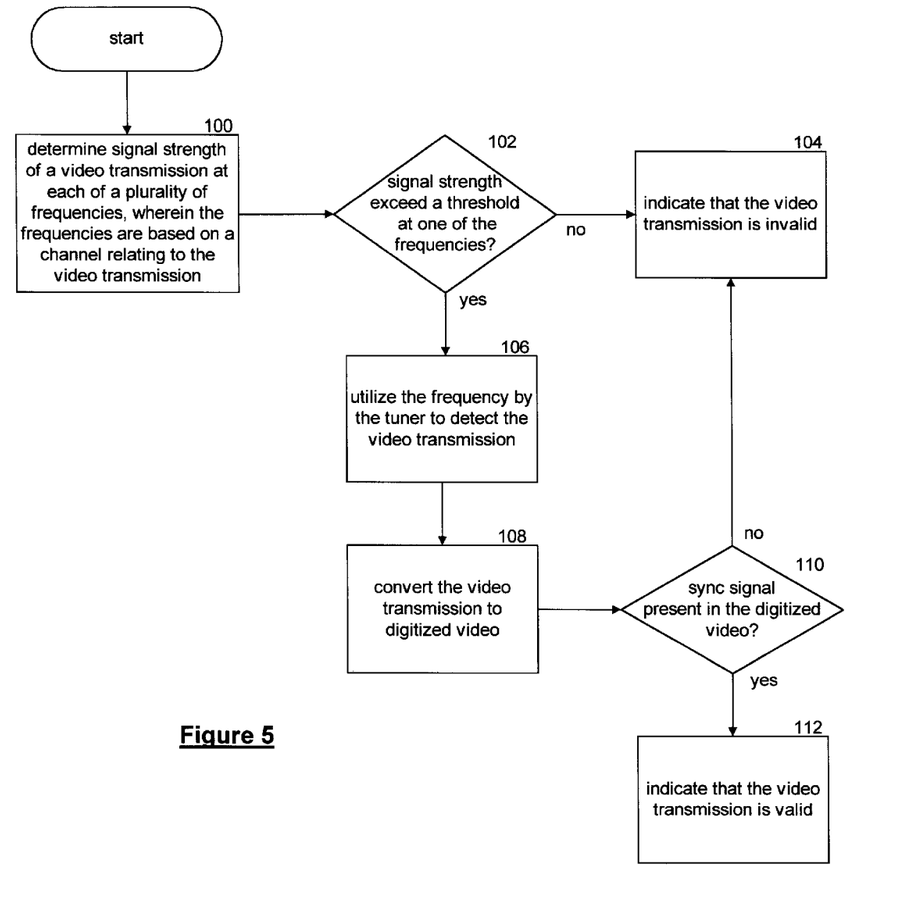
FIG. 5 illustrates a logic diagram for an alternate method of detecting valid/invalid video transmissions in accordance with the present invention.

FIG. 5 illustrates a logic diagram for another method of detecting valid and invalid video transmissions. The process begins at step 100 where signal strength of a video transmission is determined at each of the plurality of frequencies. The plurality of frequencies is based on a channel related to the video transmission. Having done this, the process proceeds to step 102 where a determination is made as to whether the signal strength of the video transmission exceeds a threshold at any one of the plurality of frequencies. If not, the process proceeds to step 104 where an indication is provided that the video transmission is invalid.

If, however, the signal strength of the video transmission does exceed the threshold at any one of the plurality of frequencies, the process proceeds to step 106. At step 106, the tuner utilizes the frequency to detect the video transmission and produce a base band signal therefrom. The process then proceeds to step 108 where the base band signal is converted into a digitized video signal. At this point, the process proceeds to step 110 where a determination is made as to whether a sync signal is present within the digitized video. If not, the process reverts to step 104 where an indication is provided that the video transmission is invalid. If, however, the sync signal is present, the process proceeds to step 112 where an indication that the video transmission is valid is provided.

Figure 6:
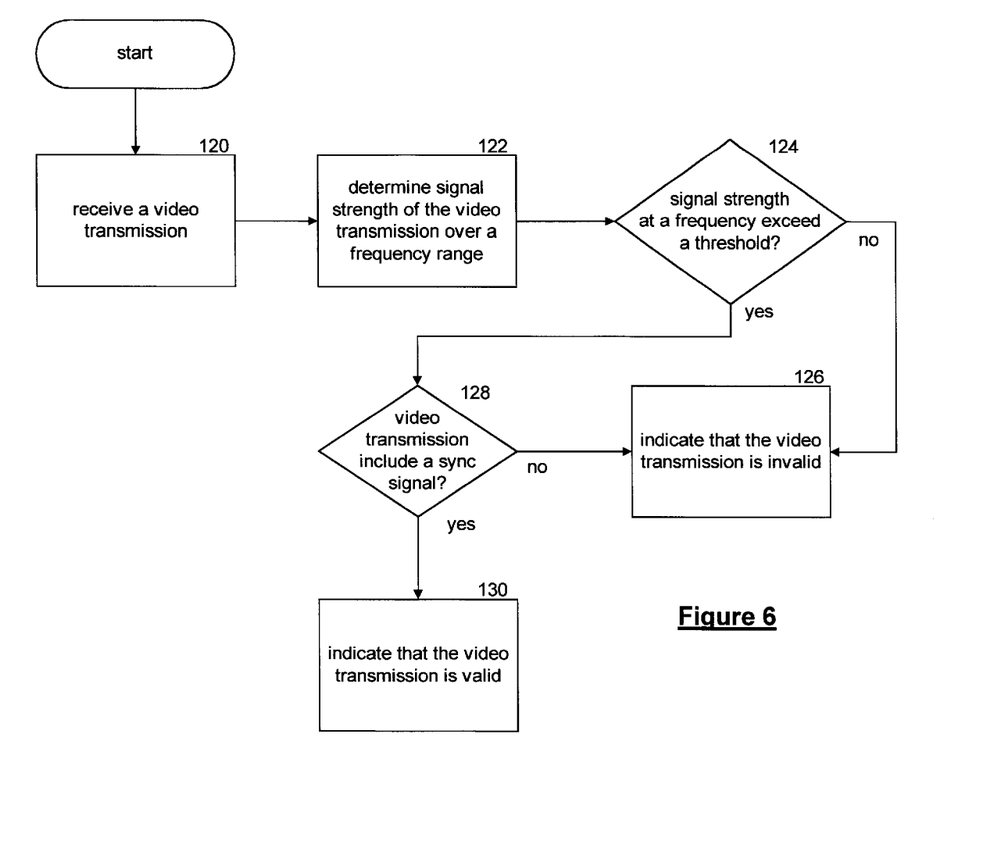
FIG. 6 illustrates a logic diagram for yet another method for detecting valid/invalid video transmissions in accordance with the present invention.

FIG. 6 illustrates a logic diagram for another method of detecting valid and invalid video transmissions. The process begins at step 120 where a video transmission is received. The process then proceeds to step 122 where signal strength of the video transmission is determined over a range of frequencies. The process then proceeds to step 124 where a determination is made as to whether the signal strength of the video transmission exceeds a threshold at any given frequency. If not, the process proceeds to step 126 where an indication that the video transmission is invalid is provided.

If, however, the signal strength of the video transmission exceeds a threshold at a given frequency, the process proceeds to step 128. At step 128, a determination is made as to whether the video transmission includes a sync signal. As previously mentioned, the indication of a sync signal may be determined by converting the video transmission to a base ban signal and then to a digitized video signal. The digitized video signal may then be examined to determine whether it includes a sync signal. Alternatively, the base ban signal, which is in the analog domain, may be analyzed to determine whether the video transmission includes the sync signal. If the sync signal is included in the video transmission, the process proceeds to step 130 where an indication that the video transmission is valid is provided.

The preceding discussion has presented a method and apparatus for automatically adjusting a video tuner of a video system regardless of the channel identification plan being used by the service providers. Such a method and apparatus allow users to receive video transmissions from various service providers that use differing channel identification plans without the user having to make any adjustments to his or her television tuner.

What is claimed is:

1. A method for detecting a video transmission, the method comprises the steps of:
   a) detecting selection of a channel corresponding to the video transmission;
   b) determining signal strength of the video transmission over a frequency range relating to the channel;
   c) determining whether the signal strength, at a frequency within the frequency range, exceeds a threshold;
   d) when the signal strength at the frequency exceeds the threshold, utilizing the frequency by a video tuner to detect the video transmission independent of whether a synchronization signal is present within a digitized base band video signal;
   e) generating, by the video tuner, a base band video signal from the video transmission;
   f) providing, by the video tuner, the base band video signal to a video decoder;
   g) digitizing, by the video decoder, the base band video signal to produce digitized video;
   h) determining whether the digitized video includes a synchronization signal; and
   i) when the digitized video includes the synchronization signal, indicating the video transmission is a valid video transmission.

2. The method of claim 1 further comprises, when the digitized video does not include the synchronization signal, indicating that the video transmission is an invalid video transmission.

3. The method of claim 1 further comprises:
   determining whether the frequency is within a first section of the frequency range;
   when the frequency is within the first section, determining whether, at another frequency in the frequency range, the signal strength exceeds the threshold; and
   when the signal strength at the another frequency exceeds the threshold, utilizing the another frequency, (previous channel information).

4. The method of claim 3 further comprises, when the signal strength at the another frequency does not exceed the threshold, utilizing the frequency in the first section of the frequency range.

5. The method of claim 1 further comprises automatically scanning a second channel corresponding to a second video transmission; and repeating steps (a) through (d) for the second video transmission.

6. The method of claim 1 further comprises detecting change of channel to a second channel corresponding to a second video transmission; and repeating steps (a) through (d) for the second video transmission.

7. A video system comprising:
   a tuner that receives a plurality of video transmissions, wherein the tuner generates a base band video signal of one of the plurality of video transmissions based on a selected channel;
   a processing unit;
   memory operably coupled to the processing unit, wherein the memory includes programming instructions that, when read by the processing unit, causes the processing unit to (a) detect selection of a channel corresponding to the video transmission; (b) determine signal strength of the video transmission over a frequency range relating to the channel; (c) determine whether the signal strength, at a frequency within the frequency range, exceeds a threshold; and (d) provide the frequency as the selected channel to the video tuner when the signal strength at the frequency exceeds the threshold independent of whether a synchronization signal is present within a digitized base band video signal;
   a video decoder operably coupled to receive the base band video signal and to generate, therefrom, a digitized video signal; and
   within the memory, programming instructions that, when read by the processing unit, causes the processing unit to determine whether the digitized video signal includes a synchronization signal and to indicate that the video transmission is a valid transmission when the digitized video signal includes the synchronization signal.

8. The video system of claim 7 further comprises, within the memory, programming instructions that, when read by the processing unit, causes the processing unit to determining whether the frequency is within a first section of the frequency range; determining whether, at another frequency in the frequency range, the signal strength exceeds the threshold when the frequency is within the first section; and utilizing the another frequency when the signal strength at the another frequency exceeds the threshold.

9. The video system of claim 7 further comprises, within the memory, programming instructions that, when read by the processing unit, causes the processing unit to detect change of channel of the tuner; determine signal strength of a second video transmission corresponding to a new channel over a second frequency range; determine whether the signal strength of the second video transmission, a second frequency within the second frequency range, exceeds a threshold; provide the second frequency as the selected channel to the video tuner when the signal strength at the second frequency exceeds the threshold.

10. A video system comprises:
    a processing unit;
    memory operably coupled to the processing unit, wherein the memory includes programming instructions that, when read by the processing unit, causes the processing unit to (a) determine signal strength of the video transmission at each of a plurality of frequencies, wherein the plurality of frequencies are based on a channel relating to the video transmission; (b) determine whether the signal strength of video transmission exceeds a threshold of at least one of the plurality of frequencies independent of whether a synchronization signal is present within a digitized base band video signal; and (c) utilize the at least one of the plurality of frequencies to detect the video transmission when the signal strength exceeds the threshold at the at least one of the plurality of frequencies; and within the memory, programming instructions that, when read by the processing unit causes the processing unit to:

generate a base band video signal from the video transmission;

digitize the base band video signal to produce digitized video;

determine whether the digitized video includes a synchronization signal; and indicate that the video transmission is a valid video transmission when the digitized video includes the synchronization signal.

11. The video system of claim 10 further comprises, within the memory, programming instructions that, when read by the processing unit, causes the processing unit to generate the plurality of frequencies to be approximately equally spaced frequency steps that includes frequencies of the channel for a multiple-carriers system.

* * * * *